United States Patent
Black et al.

[19]

[11] Patent Number: 6,027,072
[45] Date of Patent: Feb. 22, 2000

[54] PAYLOAD CHAMBER COOLING SYSTEM

[75] Inventors: Richard A. Black, Seattle; Mark L. Sloan, Newcastle; Steven R. Overton, Seattle, all of Wash.

[73] Assignee: The Boeing Company, Seattle, Wash.

[21] Appl. No.: 09/129,594

[22] Filed: Aug. 5, 1998

[51] Int. Cl.[7] .............................. B64D 11/00; B64C 1/00; F28F 1/00

[52] U.S. Cl. .................................. 244/118.5; 244/117 A; 165/41

[58] Field of Search .............................. 244/117 A, 121, 244/158 A, 134 B, 118.5; 102/293, 704; 165/80.3, 124, 125, 122, 41

[56] References Cited

U.S. PATENT DOCUMENTS

| | | |
|---|---|---|
| 1,918,568 | 7/1933 | Schirmer ............................... 244/118.5 |
| 2,694,537 | 11/1954 | Reichert ............................... 244/118.5 |
| 2,949,841 | 8/1960 | Richardson .......................... 244/118.1 |
| 3,128,964 | 4/1964 | Le Bel . |
| 3,267,856 | 8/1966 | Lindberg, Jr. . |
| 3,267,857 | 8/1966 | Lindberg, Jr. . |
| 3,682,100 | 8/1972 | Lindberg, Jr. . |
| 4,377,198 | 3/1983 | Welling et al. ............................ 165/41 |
| 4,397,215 | 8/1983 | Stroud .................................... 89/1.816 |
| 4,742,760 | 5/1988 | Horstman et al. .................... 244/118.5 |
| 4,923,146 | 5/1990 | Anthony . |
| 4,969,509 | 11/1990 | Merensky ................................. 165/41 |
| 5,148,860 | 9/1992 | Bettini ...................................... 165/41 |
| 5,490,644 | 2/1996 | Koncsek et al. . |
| 5,529,264 | 6/1996 | Bedegrew et al. .................. 244/158 R |
| 5,897,079 | 4/1999 | Specht et al. ......................... 244/118.5 |

FOREIGN PATENT DOCUMENTS

| | | | |
|---|---|---|---|
| 1232469 | 10/1960 | France ................................. 244/118.5 |
| 767314 | 2/1952 | Germany ............................ 244/134 B |
| 1292502 | 4/1969 | Germany ............................. 244/118.5 |
| 3812739 | 7/1989 | Germany ............................. 244/118.5 |
| 1050723 | 12/1966 | United Kingdom ............... 244/117 A |
| WO 92/16411 | 10/1992 | WIPO ................................. 244/118.5 |

*Primary Examiner*—Michael J. Carone
*Assistant Examiner*—Fredrick T. French, III
*Attorney, Agent, or Firm*—Christensen O'Connor Johnson & Kindness PLLC

[57] ABSTRACT

A cooling system (18) for supplying an even distribution of cooling air within a payload chamber (14) of a launch vehicle is disclosed. The cooling system (18) includes an elongate duct (20), a diverter (22), and a plurality of partitions (24a, 24b, 24c . . . ). The diverter (22) is attached to a distal end (21) of the elongate duct (20) by the plurality of partitions (24a, 24b, 24c . . . ). A turning vane (26) integral with two of the plurality of partitions (24a, 24b, 24c . . . ) extends into the elongate duct (20) dividing part of the elongate duct (20) into two separate halves. Cooling air passes through the elongate duct (20) and strikes the diverter (22) which evenly distributes the cooling air within the payload chamber (14) of the launch vehicle.

18 Claims, 4 Drawing Sheets

6,027,072

PAYLOAD CHAMBER COOLING SYSTEM

FIELD OF THE INVENTION

This invention relates to cooling systems and, more particularly, to cooling systems for launch vehicle payload chambers.

BACKGROUND OF THE INVENTION

Launch vehicle payload chambers often carry satellites. Prior to launch, it is important to keep satellite components below critical temperatures. In order to accomplish this goal, an external supply of cool air is usually pumped through the launch vehicle payload chamber. In order to prevent "hot spots," the cool air must be evenly distributed throughout the launch vehicle payload chamber. At the same time, the satellite must be protected from high velocity air, which could damage the satellite. During launch, the air supply is disconnected and other cooling mechanisms are employed.

One approach to cooling a payload chamber prior to launch has been to use an air jet or nozzle mounted at various locations and pointed towards an inner wall of the payload chamber. This approach suffers from at least two main problems. First, the airflow from the nozzle is unevenly distributed throughout the payload chamber. Additionally, cantilevered components must be used to mount the nozzle within the payload chamber, adding unnecessary weight and thus increasing power requirements.

A second approach has been to use a flat plate mounted above the satellite that is carried by the payload chamber. The plate acts as a velocity reducing chamber and also contains holes to permit some of the cooling air to flow through it. This approach also suffers from problems. First the determination of the size and placement of the holes in the plate is complicated especially when trying to design a plate which performs well under varying flow conditions. Second, the plate spans and is secured across a break joint where the payload chamber opens to release the satellite it is carrying, creating a significant risk of damage to the satellite upon release. Finally, the plate is difficult to mount and support within the payload chamber due to the intense forces the plate experiences during launch.

A third approach has been to use an annulus. Unfortunately, an annulus also suffers from problems similar to those noted above. First, the annulus spans and is secured across the break joint. Additionally, the annulus is fairly heavy, thus increasing the launch vehicle power requirements. Finally, it is difficult to determine where to position holes in an annulus so that the cooling air is adequately distributed.

Therefore, there is a need for a launch vehicle payload chamber cooling system that evenly distributes cooling air and is lightweight and reliable.

SUMMARY OF THE INVENTION

In accordance with this invention, a cooling system that evenly distributes cooling air within a launch vehicle payload chamber is provided. The cooling system comprises an elongate duct and a diverter system. The elongate duct has a proximate end and a distal end. The proximate end is attached to an opening in the payload fairing of the launch vehicle payload chamber. The elongate duct extends from the opening in the payload fairing to the nose section of the launch vehicle payload chamber. At the nose section of the launch vehicle payload chamber, the elongate duct points downward. As a result, the distal end of the elongate duct faces the underlying satellite and is centered directly above the satellite. The diverter system includes a diverter and a plurality of partitions. The plurality of partitions attach the diverter to the distal end of the elongate duct while the diverter protects the underlying satellite from any high velocity airflow that exits the distal end of the elongate duct. The diverter system causes cooling air received from the elongate duct to separate into distinct air jets that impact the interior wall of the payload chamber and radiate away from the point of impact in all directions.

In accordance with other aspects of this invention, the diverter is generally conical and has a corrugated surface that define a plurality of alternating ridges and valleys that extend outwardly from the apex of the diverter.

In accordance with further aspects of this invention, the plurality of partitions are secured to the ridges of the diverter and are further attached to the distal end of the elongate duct. The distal end of the elongate duct extends onto slots formed in the plurality of partitions. The intersection is such that a portion of each of the partitions extends into the elongate duct and is secured to the interior wall of the elongate duct while another portion of each of the partitions is secured to the exterior wall of the elongate duct. The portions of the plurality of partitions that partially extend into the elongate duct divide the distal end of the elongate duct into pie-shaped sections. By securing to the elongate duct in this manner, the plurality of partitions provide structural support for the diverter, eliminating the need to secure the diverter across the break joint at which the payload fairing breaks open after launch.

In accordance with still other aspects of this invention, the elongate duct extends upwardly from a side opening in the payload fairing at which the proximate end of the duct is located.

In accordance with still further aspects of this invention, a pair of the plurality of partitions which are 180° apart are integral with a turning vane that extends further into the elongate duct and divides the distal end of the elongate duct into two halves. Preferably, the turning vane extends from the pair of partitions secured inside the elongate duct to the point at which the elongate duct begins to turn downward to face the underlying satellite.

In accordance with additional aspects of this invention, the elongate duct has a constant cross sectional area.

In accordance with yet other aspects of this invention, the proximate end of the elongate duct has a cross sectional shape of a generally high aspect ratio ellipse and the distal end of the elongate duct has a cross sectional shape of a circle. As the elongate duct extends from the proximate end to the distal end, the cross sectional area gradually changes in shape from a generally high aspect ratio ellipse to a generally lower aspect ratio ellipse to a circle.

In accordance with still further aspects of the invention, the ridges of the diverter are generally convex shaped, and the valleys of the diverter are generally concave shaped such that together the plurality of ridges and valleys form a sinusoidally-shaped surface. Preferably, the sum of the areas of the plurality of valleys is slightly more than the cross-sectional area of the distal end of the elongate duct.

As will be readily appreciated from the foregoing description, the invention provides a cooling system that after being secured to an interior wall of a launch vehicle payload chamber, performs multiple functions, most importantly distributing cooling air evenly within the launch vehicle payload chamber prior to launch. The constant cross-sectional area of the elongate duct and the shape of the elongate duct minimizes any pressure losses within the system. The diverter protects the underlying satellite from any high velocity airflow that exits the distal end of the elongate duct and can damage the satellite. The diverter also creates separate and distinct air jets that, after contacting the interior wall of the payload chamber, radiate away from the point of impact in all directions so that all regions of the launch vehicle payload chamber have a continuous supply of cool air. The cooling system also reduces the possibility of payload fairing separation problems since the cooling system is supported by the payload fairing on one side of the break joint. A cooling system formed in accordance with the invention is simple, reliable and lightweight.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
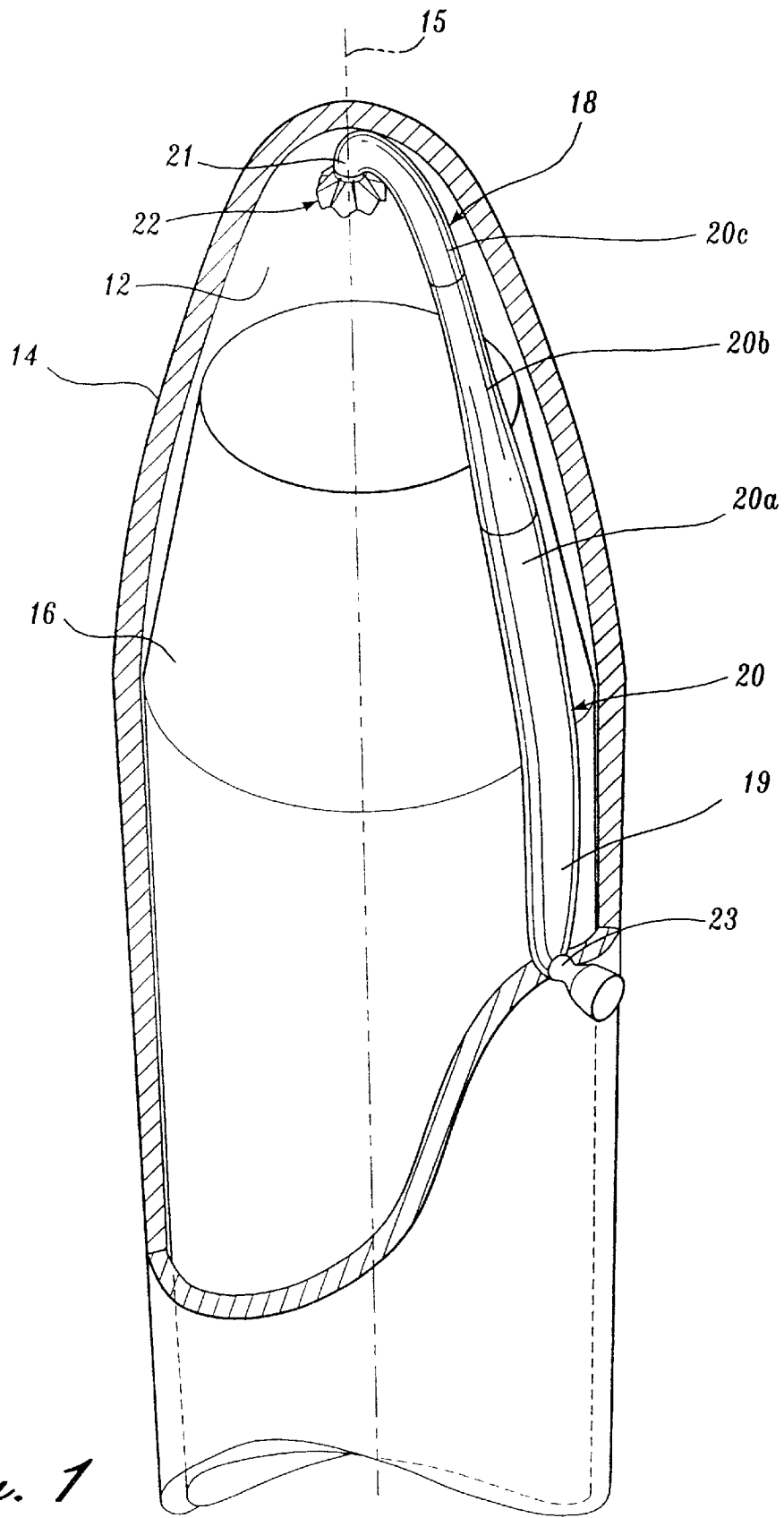
FIG. 1 is a pictorial view of a payload launch vehicle depicting a payload chamber cooling system formed in accordance with this invention secured to an interior wall of the fairing of a launch vehicle payload chamber.

The present invention is a cooling system for use inside a payload chamber of a launch vehicle. FIG. 1 illustrates a launch vehicle payload chamber 12 defined by a payload fairing 14. Located inside of the launch vehicle payload chamber 12 is a satellite 16. Also located inside of the launch vehicle payload chamber 12 and shown attached to the interior wall of the payload fairing 14 is a cooling system 18 formed in accordance with this invention. The cooling system 18 comprises an elongate duct 20, a diverter 22, and a plurality of partitions 24a, 24b, 24c. . . As further shown in FIG. 2, which illustrates a perspective view of a portion of the cooling system 18, a pair of the plurality of partitions 24a and 24e, which are 180° apart are integrally formed with a turning vane 26.

Returning to FIG. 1, the elongate duct 20 has a proximate end 19 and a distal end 21. The proximate end 19 of the elongate duct 20 attaches the cooling system 18 to an opening 23 in the payload fairing 14 to which an exterior cooling air source (not shown) is attached. The elongate duct 20 extends from the opening 23 in the payload fairing 14 upwards to the nose section of the launch vehicle payload chamber 12. At the nose section, the elongate duct 20 turns downward such that the distal end 21 of the elongate duct 20 is centered in the nose section of the launch vehicle payload chamber 12 and opens directly above the satellite 16. The diverter 22 is attached to the distal end 21 of the elongate duct 20 by the plurality of partitions 24a, 24b, 24c, . . . and the turning vane 26 and thus, is also centered in the nose section of the launch vehicle payload chamber 12 and positioned directly above the satellite 16.

The elongate duct 20, the plurality of partitions 24a, 24b, 24c, . . . , the turning vane 26, and the diverter 22 are formed of a lightweight material that is strong enough to handle the pressure created from the air flow. Preferably, a thermal plastic graphite composite material is used. This material is also desirable since it can more easily create the curved aspects of the cooling system.

As shown in FIG. 1, the payload fairing 14 is separated into two halves by a break joint line 15 at which the payload fairing breaks open after launch. The cooling system 18 is supported by one half of the payload fairing 14, preferably by clamping the elongate duct 20 to the interior wall of the payload fairing 14 on one side of the break joint line 15. The diverter 22 is secured to the plurality of partitions 24a, 24b, 24c, . . . which are in turn secured to the distal end 21 of the elongate duct 20 both by any suitable attachment mechanism. Preferably, these elements are bonded together by a suitable adhesive. Thus, even though the diverter 22 and the distal end 21 of the elongate duct 20 span across the break joint line 15, because the cooling system 18 is attached to only one side of the payload fairing 14, the possibility of payload fairing separation problems occurring is reduced.

The elongate duct 20 receives cooling air from an outside supply source at the opening 23 in the payload fairing 14, channels the cooling air up the launch vehicle payload chamber 12, and releases the cooling air from the distal end 21 of the elongate duct 20. The elongate duct 20 has a constant cross-sectional area along its entire length, i.e., from the opening 23 in the payload fairing 14 to the nose section of the launch vehicle payload chamber 12. While the cross-sectional area of the elongate duct 20 remains constant, the cross-sectional shape changes. Preferably, the cross-sectional shape is generally curved and has no sharp edges or corners. Most preferably, the cross section of the section 20a of the elongate duct 20 at the proximate end 19 has a generally high aspect ratio ellipse. The generally high aspect ratio ellipse has a more flattened shape than an ideal high aspect ratio ellipse. More specifically, the proximate end 19 flares from opening 23, which is generally circular to the generally high aspect ratio ellipse section 20a. As the elongate duct 20 progresses up the payload fairing 14 towards the nose section of the launch vehicle payload chamber 12, the generally high aspect ratio ellipse section 20a joins a section 20b that gradually becomes a generally lower aspect ratio ellipse. The generally lower aspect ratio ellipse has an asymmetrical shape such that one side is slightly more curved than the other. The generally lower aspect ratio ellipse section 20b joins a hook-shaped section 20c that has a circular cross section.

Figure 2:
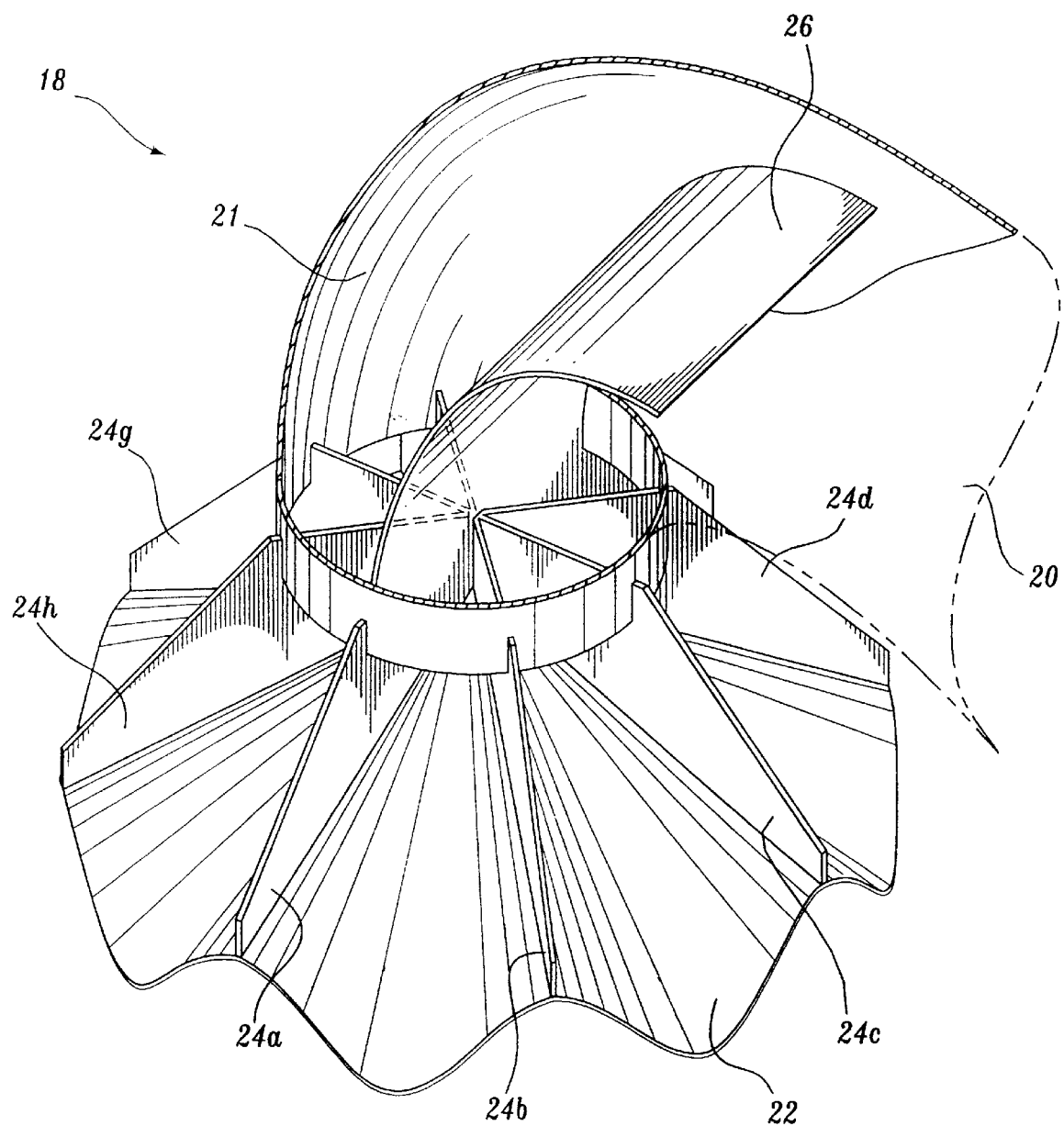
FIG. 2 is a perspective view of a portion of the payload chamber cooling system of the present invention depicting a phantom duct secured to a diverter.
Figure 3:
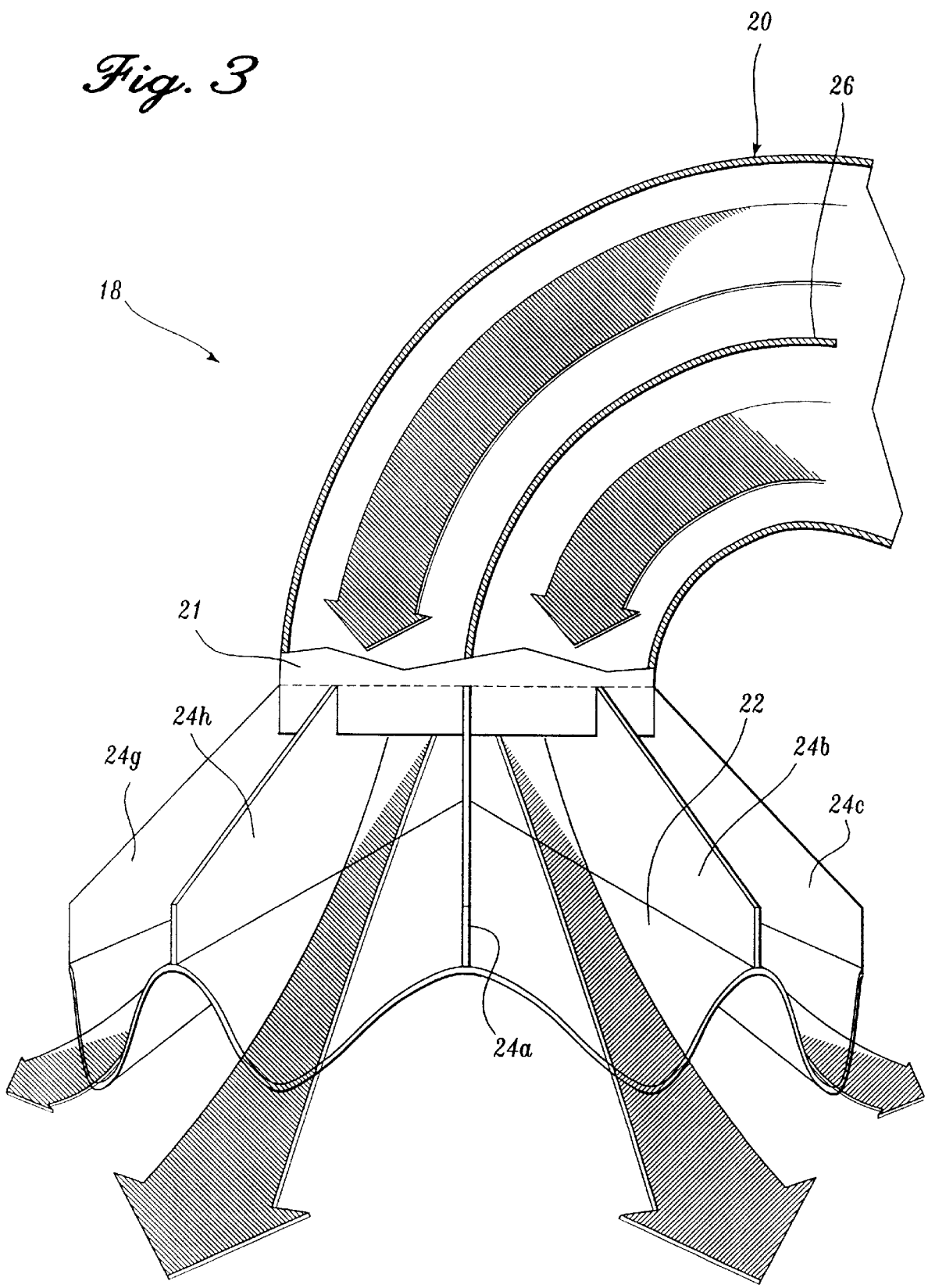
FIG. 3 is a side view of a portion of the payload chamber cooling system of the present invention depicting the distribution of airflow throughout the interior of a duct and out the end of the duct onto a diverter.

FIG. 3 illustrates a side view of the cooling system 18 showing the flow of cooling air within the elongate duct 20 and exiting the elongate duct 20 onto the diverter 22. The diverter 22 protects the underlying satellite 16 (shown in FIG. 1) from high velocity airflow exiting the elongate duct 20. The shape of the diverter 22 is generally conical. However, as shown in both FIGS. 2 and 3, the surface of the diverter 22 is corrugated such that an alternating plurality of ridges and valleys extend from the vertex of the diverter 22. Preferably, the diverter 22 has eight ridges and eight valleys that equally divide its surface. The curvature of each of the ridges is generally convex and the curvature of each of the valleys is generally concave such that the ridges and valleys together form a sinusoidal-shaped surface. The diverter 22 is designed in this manner so that it forces the cooling air received from the elongate duct 20 into the valleys of the diverter 22. Each valley has sufficient depth so that the cooling air exiting the elongate duct 20 flows into and along each valley and does not pass over adjacent ridges into other valleys. Thus, as shown in FIG. 3, the diverter 22 produces separate and distinct air jets. Since the valleys are equidistantly spaced around the diverter 22, the distinct air jets disperse uniformly from the diverter 22 over 360°. Each valley also has sufficient depth in order to force the distinct air jets to make contact with the interior wall of the payload fairing 14 in such a way that air jets radiate away from the point of impact in all directions creating a flow pattern that permeates and thus cools all regions of the payload fairing 14 and the payload chamber 12. Preferably, the sum of the areas of each valley is slightly more than the cross-sectional area of the distal end 21 of the elongate duct 20. In addition, the valleys are sufficiently steep in order to minimize pressure losses occurring when the airflow strikes the diverter while, at the same time, they are shallow enough to protect the underlying satellite from high velocity airflow exiting the cooling system.

As best shown in FIG. 2, the diverter 22 is attached to the elongate duct 20 via the plurality of partitions 24a, 24b, 24c... Each of the plurality of partitions 24a, 24b, 24c... is attached to one of the ridges on the diverter 22. The partitions meet at the vertex of the diverter 22 and radially extend outward, dividing the diverter 22 into equal sections. Each of the plurality of partitions 24a, 24b, 24c... is also attached to the distal end 21 of the elongate duct 20. The distal end 21 of the elongate duct 20 extends into slots in the plurality of partitions. The intersection is such that a portion of each of the partitions partially extends into the duct and is attached to an interior side of the duct and another portion of each of the partitions extends radially outwardly from the duct and is attached to an exterior side of the duct. Essentially, the portion of the partitions lying inside of the elongate duct 20 divides the duct into eight equal pie-shaped sections. Preferably, the partitions 24a, 24b, 24c... extend into the elongate duct 20 approximately 3 inches. Since the primary function of the partitions is to secure the diverter 22 to the elongate duct 20 and thus provide adequate structural support, the extent to which the partitions extend into the elongate duct 20 can vary depending upon the stability desired. Besides providing structural support, the partitions also facilitate the separation of the airflow into the separate and distinct air jets. Although, as described above, a partition preferably attaches to each ridge on the diverter 22, a fewer number of partitions may be used as long as structural stability is still provided. In order to maintain structural stability when using a fewer number of partitions, the partitions could extend further into the elongate duct 20.

As best shown in FIG. 2, the turning vane 26, which is integral with a pair of partitions 24a and 24e that are 180° apart, extends further into the elongate duct 20. Preferably, the turning vane 26 is thin and flat. The turning vane 26 is secured to the interior wall of the elongate duct 20 and divides the elongate duct 20 into two halves. Thus, the turning vane further secures the diverter 22 to the elongate duct 20 and provides more structural stability. Preferably, the turning vane 26 extends into the elongate duct 20 until the point at which the elongate duct begins to turn downwards to face the satellite 16. Preferably, the elongate duct 20 is divided into an upper half and a lower half by the turning vane 26 at the point at which the elongate duct 20 begins to turn downwards to face the satellite 16 as best shown in FIG. 3. Most preferably, the turning vane is horizontal at this point. By dividing the elongate duct 20 in this manner, the turning vane 26 controls the distribution of the airflow within the elongate duct 20 so that, as the airflow approaches the point at which the elongate duct 20 begins to turn downwards and face the satellite 16, high velocity airflow is both prevented from moving solely toward the upper half of the elongate duct 20 as the direction of the airflow is forced to change due to the shape of the duct and also prevented from producing an uneven distribution of airflow as it exits the duct. In effect, the turning vane 26 separates the airflow such that the cooling air is evenly distributed between the two halves of the duct created by the turning vane 26. Thus, changing the mass flow rate of the airflow passing through the cooling system 18 does not affect the even flow distribution of the cooling air. As will be appreciated by one skilled in the art and others, the turning vane 26 may extend further into the elongate duct 20 and also multiple turning vanes may be used to further divide the elongate duct, for further evening of the distribution of the airflow and for providing more structural support. However, at the same time, the further the turning vane extends into the elongate duct and the more turning vanes used, the higher the pressure losses within the system become.

Figure 4:
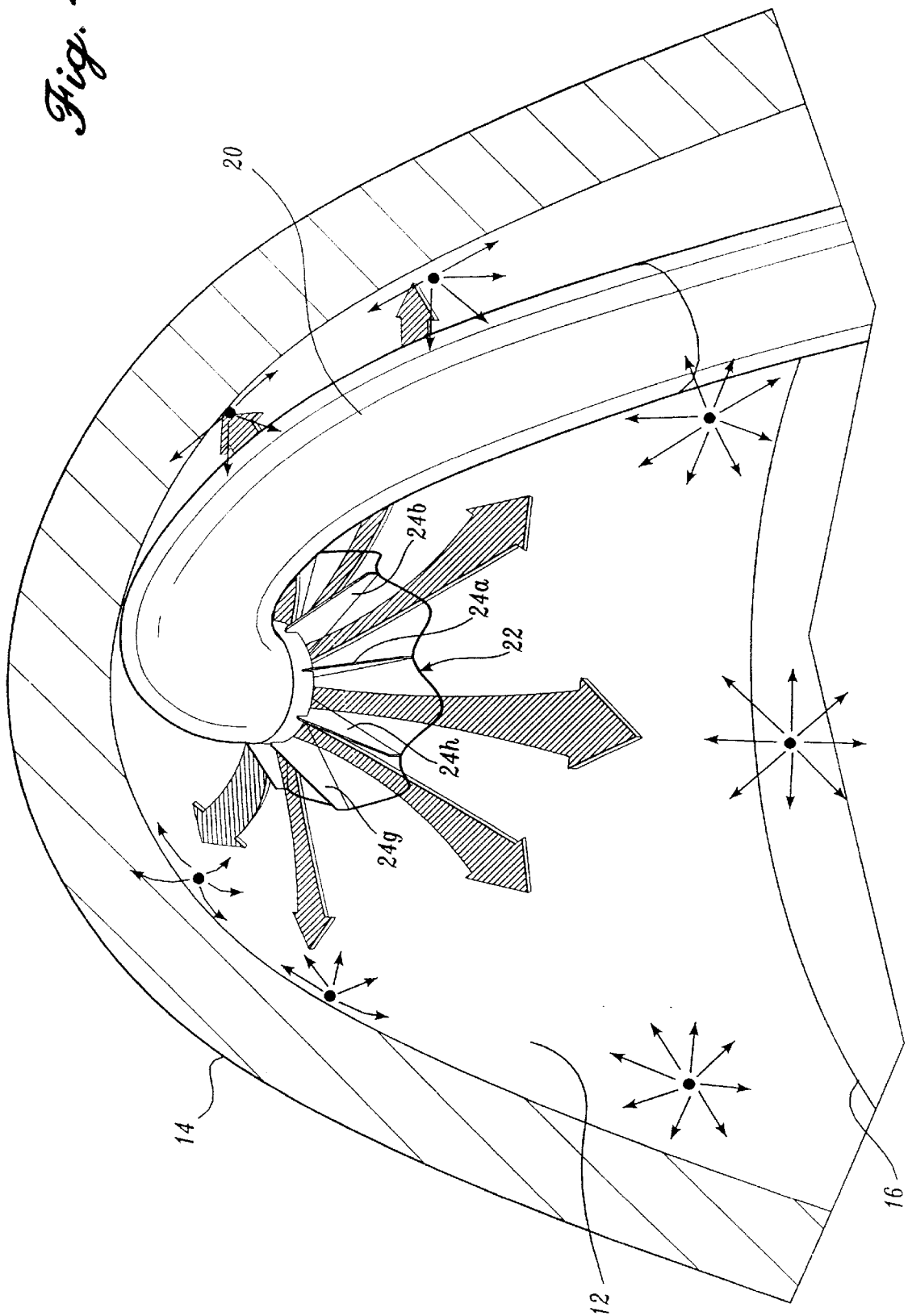
FIG. 4 is an environmental view of a portion of the payload chamber cooling system of the present invention within the launch vehicle payload chamber depicting the distribution of airflow from the cooling system and within the launch vehicle payload chamber.

By using arrows depicting the flow of cooling air, FIGS. 3 and 4 together illustrate the distribution of cooling air as it exits the elongate duct, strikes the diverter, and flows down the valleys of the diverter into the payload chamber. As shown in FIG. 3, the turning vane 26 separates the airflow into two sections. As the flow of cooling air exits the distal end 21 of the elongate duct 20, eight distinct air jets are created when the flow of cooling air strikes the diverter 22 and flows into the valleys of the diverter 22. As shown in FIG. 4, which is an environmental view of a portion of the cooling system 18 in the nose section of the launch vehicle payload chamber 12, as the eight distinct jets exit the cooling system 18, the air jets impact the interior wall of the payload fairing 14 and move away from the point of impact in all directions. Thus, the airflow permeates to all regions of the launch vehicle payload chamber 12, including the nose section of the fairing located above the cooling system 18. The impact of the air jets on the interior wall of the payload fairing 14 also reduces the velocity of the air jets which in turn minimizes the disturbance of the airflow on the satellite 16.

As will be readily appreciated by those skilled in the art and others, a cooling system formed in accordance with this invention has a number of advantages. First, the cooling system protects the satellite from high velocity airflow, which can damage the satellite. Second, the cooling system provides an even distribution of airflow throughout the payload chamber so that all regions have a continuous supply of cool air, regardless of the mass flow rate of the cooling air as it passes through the cooling system. Third, maintaining a constant cross-sectional area throughout the duct of the cooling system and minimizing sharp bends and corners in the duct both minimize pressure losses. The cooling system also reduces the possibility of payload fairing separation problems since the cooling system is supported by only one side of the payload fairing. Finally, a cooling system formed in accordance with this invention is simple, reliable and lightweight.

While the presently preferred embodiment of the invention has been illustrated and described, it will be appreciated that various changes can be made therein without departing from the spirit and scope of the invention. For example, the overall shape of the elongate duct as it extends from the proximate end to the distal end can be altered to suit the needs within the launch vehicle payload chamber. Furthermore, the number of alternating ridges and valleys on the surface of the diverter may be varied. As mentioned above, the number of partitions that are secured to ridges of the diverter may also be varied depending upon the structural support needed to adequately secure the diverter to the elongate duct. Even further, the extent to which the plurality of partitions and the turning vane extend up into the elongate duct may vary depending both upon pressure loss requirements and upon the need to further separate the cooling airflow so that it is evenly distributed within the launch vehicle payload chamber. Thus, within the scope of the appended claims, it is to be understood that the invention can be practiced otherwise than as specifically described herein.

The embodiments of the invention in which an exclusive property or privilege is claimed are defined as follows:

1. A cooling system for use inside a launch vehicle payload chamber, the launch vehicle payload chamber having a nose section, a payload, and a payload fairing, the payload fairing having an interior wall and a break joint at which the payload fairing opens, dividing the payload fairing into two halves, said cooling system comprising:

an elongate duct for providing a passageway through which cooling air is distributed to said launch vehicle payload chamber, said elongate duct having a distal end and a proximate end, the proximate end for engaging an opening in said payload fairing; and a diverter system attached to said distal end of said elongate duct, said diverter system and said distal end of said elongate duct positioned in said nose section of said launch vehicle payload chamber, said diverter system including a diverter and a plurality of partitions for attaching said diverter to said distal end of said elongate duct, said diverter for receiving said cooling air from said duct and distributing said cooling air within said launch vehicle payload chamber.

2. The cooling system of claim 1, including a turning vane integral with a pair of said plurality of partitions for further securing said diverter to said elongate duct and for dividing a portion of said passageway of said elongate duct into two halves.

3. The cooling system of claim 1, wherein said elongate duct has a constant cross-sectional area.

4. The cooling system of claim 3, wherein said proximate end of said elongate duct has a cross-sectional shape of a generally high aspect ratio ellipse.

5. The cooling system of claim 4, wherein said elongate duct has a cross-sectional shape of a generally lower aspect ratio ellipse as said elongate duct extends from said proximate end to said distal end.

6. The cooling system of claim 5, wherein said distal end of said elongate duct has a cross-sectional shape of a circle.

7. The cooling system of claim 1, wherein said elongate duct is attached to said interior wall of said payload fairing on one side of said break joint.

8. The cooling system of claim 1, wherein said diverter is generally conical, said generally conical diverter having a corrugated surface formed from a plurality of alternating ridges and valleys extending outwardly from the vertex.

9. The cooling system of claim 8, wherein said ridges are generally convex-shaped and said valleys are generally concave-shaped.

10. The cooling system of claim 8, wherein the depth of said valleys is shallow enough to protect the underlying payload from high velocity airflow exiting the cooling system and steep enough so as to minimize pressure losses.

11. The cooling system of claim 8, wherein said plurality of ridges and valleys are equidistantly spaced.

12. The cooling system of claim 11, wherein the number of said plurality of valleys is eight and the number of said plurality of ridges is eight.

13. The cooling system of claim 12, wherein the cross-sectional area of said distal end of said elongate duct is slightly more than the sum of the areas of said plurality of valleys.

14. The cooling system of claim 8, wherein each of said plurality of partitions is attached to one of said ridges of said generally conical diverter.

15. The cooling system of claim 14, wherein said plurality of partitions extend into said distal end of said elongate duct and secure to the interior wall of said elongate duct.

16. The cooling system of claim 15, wherein said plurality of partitions secure to the exterior wall of said elongate duct.

17. The cooling system of claim 15, wherein a pair of said plurality of partitions includes a turning vane for further securing said diverter to said elongate duct and for dividing a portion of said passageway of said elongate duct into halves.

18. The cooling system of claim 17, wherein said turning vane extends into said elongate duct from said pair of said plurality of partitions to a point at which said elongate duct begins to turn downward to face the underlying payload.

* * * * *